May 1, 1928.
P. N. LANDINE
1,668,213
FOLDING SEAT
Filed March 25, 1926
3 Sheets-Sheet 1
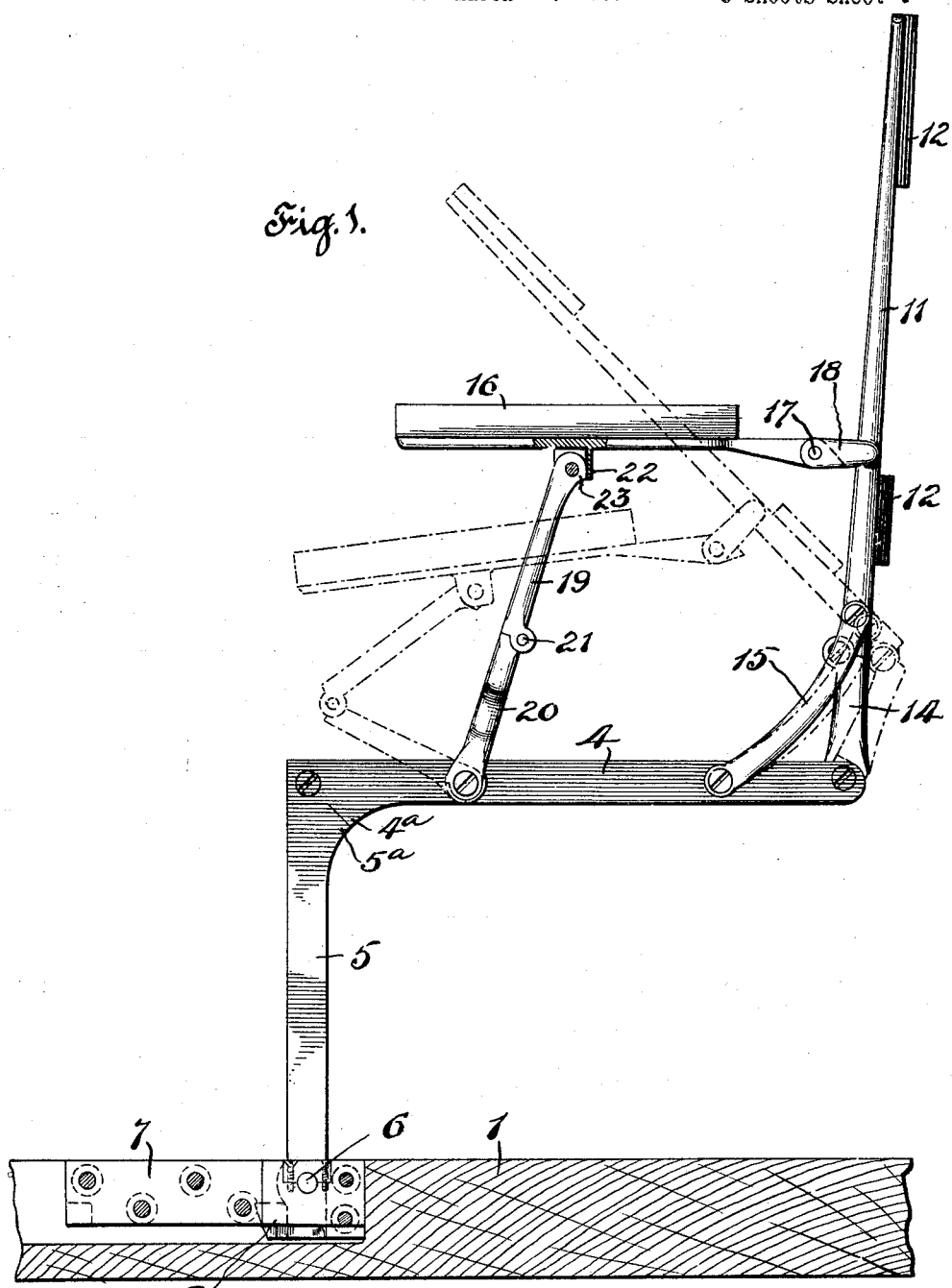

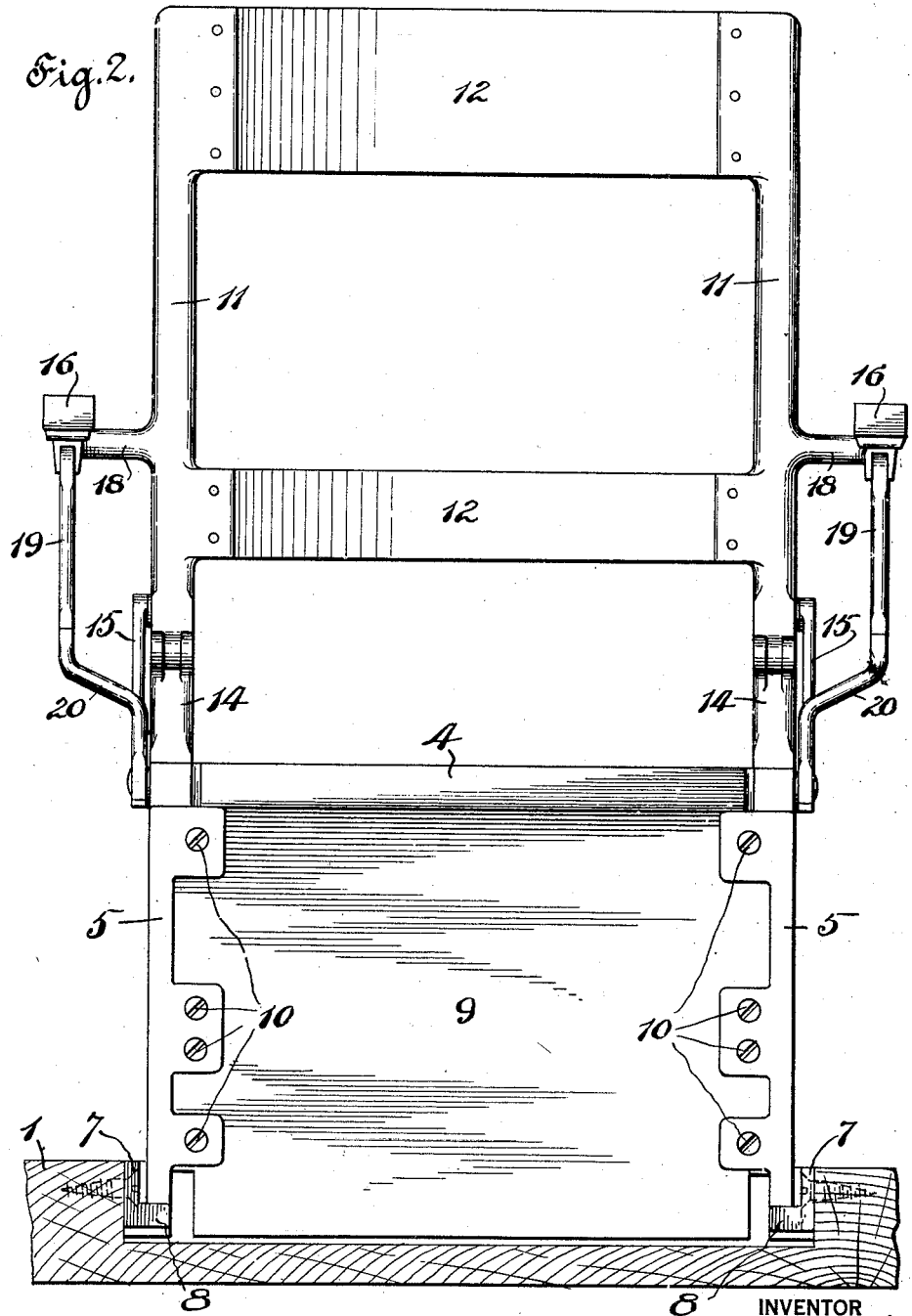

May 1, 1928.
P. N. LANDINE
1,668,213
FOLDING SEAT
Filed March 25, 1926
3 Sheets-Sheet 3
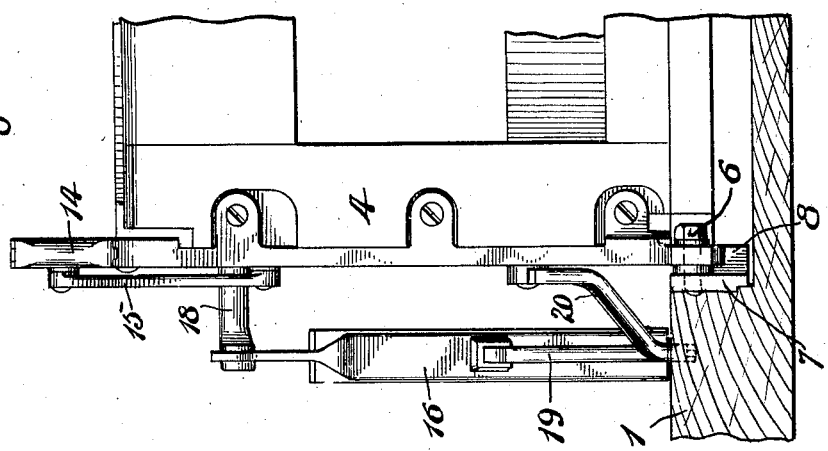
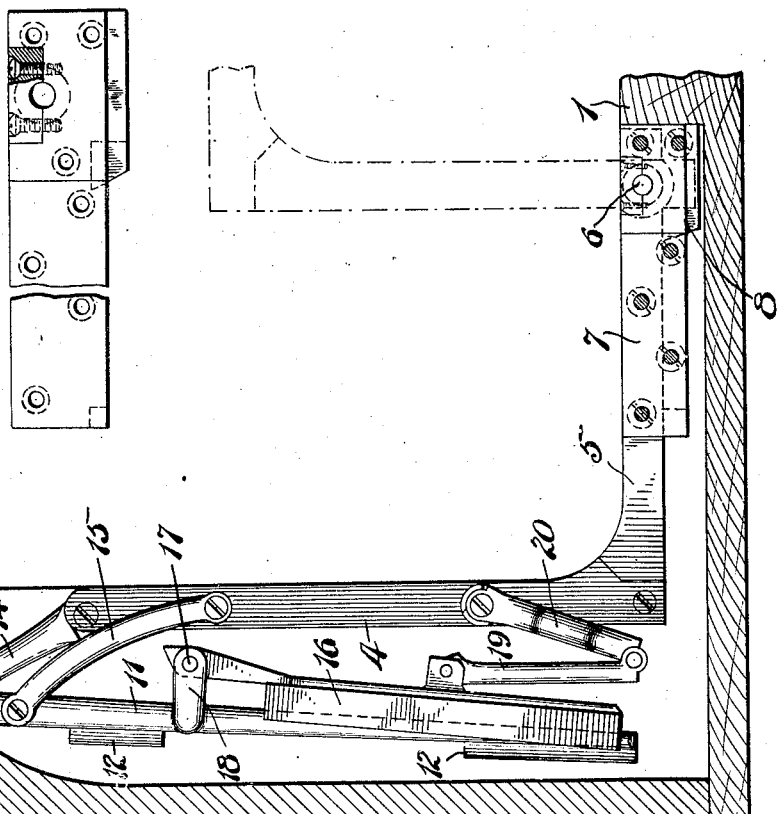
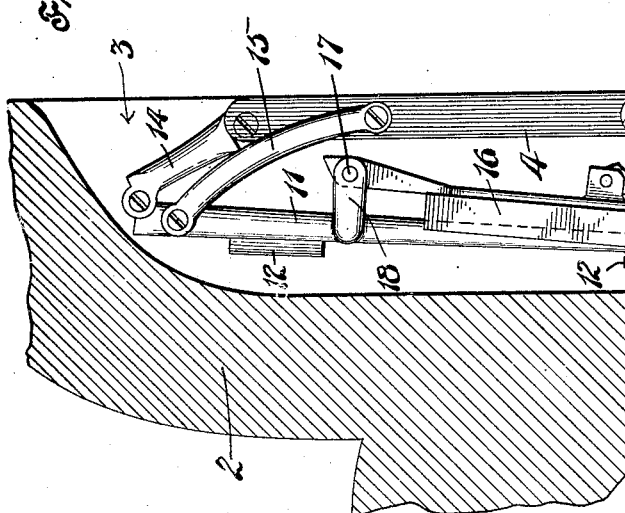
INVENTOR
P. N. Landine,
BY
Mitchell & Bechert
ATTORNEYS.

Patented May 1, 1928.

1,668,213

UNITED STATES PATENT OFFICE.

PETER N. LANDINE, OF MILFORD, CONNECTICUT.

FOLDING SEAT.

Application filed March 25, 1926. Serial No. 97,268.

This invention relates to folding seats and the improvements are of particular utility when employed in connection with the rear section of an automobile body wherein, when it is desired to provide an extra seat or two, such a seat may be mounted on the floor between the back of the front seat and the front of the rear seat and, when not in use, may be folded forward in the back of the front seat so as to be out of the way. Folding seats for this purpose are well known but such seat structures have heretofore been such that the back portion is of very limited height and correspondingly uncomfortable. The purpose of the present invention is to improve the structure so that a high, comfortable back support is provided without adding materially to the size of the seat when folded up.

The invention will be clearly understood by reference to the accompanying drawings, in which—

Fig. 1 is a side elevation of my folding seat opened up and ready for use, the upholstery, however, being omitted;

Fig. 2 is a front elevation of the parts as shown in Fig. 1;

Fig. 3 is a side elevation of my improved seat when folded and turned to the out of the way position.

Fig. 4 is a rear view of the parts as they appear when folded up, this view showing only one side of the seat;

Fig. 5 is a side view in partial section of a detail.

1 represents the floor upon which the seat is mounted. 2 represents the back of the front seat of an automobile. 3 is a recess in the back of the front seat into which the folding seat may be projected when it is folded up. As above indicated, the drawings do not illustrate the upholstery which of course is ordinarily added, and the construction of which is immaterial. The drawings do, however, show the entire frame structure in which 4 represents the seat bottom of the proper dimensions as to width and depth. At each front corner of the seat is provided a leg 5—5 each of which is pivoted at 6 to a floor plate 7, which is mounted in a recess in the floor 1 so as to be about flush therewith. 8 is a stop shoulder on the plate 7 against which the end of the leg 5 engages (as shown in Fig. 1) to hold the leg in an upright position when the seat is opened up. If desired, each leg 5—5 may be provided with flanges or lugs to which an intervening board 9 may be secured by means of suitable fastenings, such as screws 10—10. This board serves to powerfully reinforce the legs. The seat 4 is preferably so designed that when it is turned into a right angle position with reference to the legs 5 (as shown in Fig. 1) stop shoulders 4ª—5ª will hold the seat in said position. It is preferable that the seat 4 should be pivotally connected to the legs 5 so that the seat may be swung ahead without folding the same, whereby occupants of a rear seat may freely pass the folding seat. 11—11 are side-bars of a back frame provided with one or more suitable intervening connecting strips 12—12 not only to stiffen the same, but upon which to mount upholstery. Instead of pivotally connecting this back frame directly to the rear edge of the seat as heretofore, I provide between the lower end of each side-bar 11 and the adjacent rear corner of the seat, a toggle link which link at its lower end is pivoted to the seat 4, and at its upper end is pivoted to its side-bar 11. By means of this link, a back support higher than the depth of the seat proper may be provided without requiring much more space than occupied by said seat when the seat is folded down. Furthermore, when folded down, the upper edge of the back support may not extend below the forward edge of the seat 4 (see Fig. 3) and hence no additional space in the bottom or floor of the car is required as would otherwise be the case if the back support were substantially higher than the depth of the seat and were hinged thereto in the usual manner. At each side of the seat I provide a plain link 15 which is pivotally connected at its lower end to the side of the seat forward of the pivot for the link 14. The upper end of this link is pivotally connected to its complementary side-bar 11 at a point above the pivotal connection of the toggle link 14 therewith. The pivotal connection between the toggle link 14 and its side-bar 11 is preferably forward of a center line intersecting said parts when straightened out, as shown in dotted lines (Fig. 1) so that being off center, the link 14 and the side-bar 11 will stand in alignment until sufficient force is applied to the upper part of the back support from the rear to break said toggle, the link 15 at each side of the seat then acting as a fulcrum to cause the toggle to buckle backwardly as indicated in dotted lines (Fig. 1). As the back is forced down from the dotted line position, shown in Fig. 1, the links 15 operate to force the back support and toggle 14 rearwardly relatively to the seat 4 so that when the back support is completely folded down, its upper edge will lie adjacent to the forward edge of the seat 4, whereby these parts thus folded may be turned down into the position shown in Fig. 3.

In the preferred construction I also provide side arm supports, and a description of one of these will be sufficient as both side arms correspond. 16 represents an arm support or pad, which is pivoted at 17 to a lug 18 projecting forwardly from the side-bar 11 of the back. 19—20 are toggle links which pivotally connect the arm pad 16 with the side of the seat 4 and act as a strut support for the former. The pivot 21 of the toggle links is preferably off center so that these toggles, when straightened out, will remain in that position until the toggle is "broken." I provide means to automatically "break" this toggle when forward pressure is applied to the back support. This means comprises a shoulder 22 which engages a shoulder 23 at the upper end of the toggle link 19. This makes it unnecessary to perform any separate act to break the toggle links 19—20 at each side of the seat, since forward pressure applied to the upper part of the back support causes the arm pad 16 to move ahead, and this movement, through the operation of the shoulder 22, instantly breaks the toggle strut for said arm pad so that as continued pressure is applied to the back to fold it down, the arm pad will likewise fold down, said strut will buckle forwardly and as indicated by dotted lines in Fig. 1.

In order to facilitate removal of the chair without the necessity of removing the floor plates 7 and to facilitate installation of the chair, I prefer to make that part of each floor plate 7, constituting the bearings for the pivots 6—6, in two parts held together as by means of screws as shown particularly in Fig. 5. It will be plain that after removing the screws the cap portion of the plate 7 may be removed and the chair then raised bodily leaving the plates 7 in place in the floor.

From the foregoing, it will be seen that by the means described, an unusually high back support may be provided for this folding seat that will operate to the great comfort and convenience of the user, as compared with a back the height of which is substantially no more, and frequently less, than the depth of the seat proper.

I have shown my improved folding seat in a preferred form only, but I wish to have it understood that various modifications may be made without departing from the spirit and scope of the invention.

I claim:

A seat of the character described, comprising, a leg support, a leg pivoted thereto, a seat bottom connected with said leg at an angle thereto, a back frame, a backwardly opening toggle link connecting the lower end of the latter to the rear of the seat bottom, a plain link connected at one end to the seat at a point forward of the toggle link and at its other end to said back frame at a point above said toggle link, an arm pad pivotally connected to said back frame above the toggle link, and a forwardly opening toggle strut connecting said arm pad with said seat bottom, said toggle strut being composed of links of substantially the same length, with means on the arm to engage the upper link of said strut to automatically break said toggle strut when the back is folded down.

PETER N. LANDINE.